US012675762B2

(12) United States Patent
Zhang

(10) Patent No.: US 12,675,762 B2
(45) Date of Patent: Jul. 7, 2026

(54) PLUG-IN PROCESS MANAGEMENT SYSTEM, ELECTRONIC DEVICE AND BUSINESS PROCESS MANAGEMENT METHOD

(71) Applicants: VERISILICON MICROELECTRONICS (SHANGHAI) CO., LTD., Shanghai (CN); VERISILICON MICROELECTRONICS (CHENGDU) CO., LTD., Chengdu (CN); VERISILICON MICROELECTRONICS (NANJING) CO., LTD., Nanjing (CN); VERISILICON TECHNOLOGY (SHANGHAI) CO., LTD., Pudong New Area (CN); VERISILICON MICROELECTRONICS (HAINAN) CO., LTD., Haikou (CN); VERISILICON MICROELECTRONICS (BEIJING) CO., LTD., Beijing (CN)

(72) Inventor: Yukun Zhang, Shanghai (CN)

(73) Assignees: VERISILICON MICROELECTRONICS CO., LTD., Shanghai (CN); VERISILICON MICROELECTRONICS (CHENGDU) CO., LTD., Sichuan (CN); VERISILICON MICROELECTRONICS (NANJING) LTD., Nanjing (CN); VERISILICON TECHNOLOGY (SHANGHAI) CO., LTD., Shanghai (CN); VERISILICON MICROELECTRONICS (HAINAN) LTD., Hainan (CN); VERISILICON MICROELECTRONICS (BEIJING) LTD., Beijing (CN)

( * ) Notice: Subject to any disclaimer, the term of this patent is extended or adjusted under 35 U.S.C. 154(b) by 152 days.

(21) Appl. No.: 18/569,794

(22) PCT Filed: Aug. 10, 2023

(86) PCT No.: PCT/CN2023/112339
§ 371 (c)(1),
(2) Date: Dec. 13, 2023

(87) PCT Pub. No.: WO2025/030522
PCT Pub. Date: Feb. 13, 2025

(65) Prior Publication Data
US 2025/0232247 A1     Jul. 17, 2025

(51) Int. Cl.
*G06Q 10/06* (2023.01)
*G06F 9/445* (2018.01)
*G06Q 10/067* (2023.01)

(52) U.S. Cl.
CPC ....... *G06Q 10/067* (2013.01); *G06F 9/44526* (2013.01)

(58) Field of Classification Search
CPC .. G06Q 10/067; G06Q 10/00; G06Q 10/0633; G06Q 10/10; G06F 9/44526;
(Continued)

(56) References Cited

U.S. PATENT DOCUMENTS

| | | | | |
|---|---|---|---|---|
| 7,996,380 B2 * | 8/2011 | Arrouye | ................ | G06F 16/907 707/706 |
| 8,826,287 B1 * | 9/2014 | Graupner | .............. | G06F 9/5061 709/224 |

(Continued)

FOREIGN PATENT DOCUMENTS

| | | | | |
|---|---|---|---|---|
| CA | 3104733 A1 * | 12/2020 | ........... | G06Q 10/107 |
| CN | 101645778 A * | 2/2010 | | |

(Continued)

OTHER PUBLICATIONS

International Search Report and Written Opinion with regard to PCT/CN2023/112339 mailed Sep. 13, 2023.
(Continued)

*Primary Examiner* — Hicham Skhoun
(74) *Attorney, Agent, or Firm* — BCF LLP

(57) ABSTRACT
The present disclosure relates to a plug-in process management system, an electronic device, and a business process management method, which belongs to the field of computers. The plug-in process management system includes N storage spaces and N business plug-ins, wherein N is an integer greater than or equal to 2. Each of the business
(Continued)

plug-ins corresponds to an independent storage space, and each of the business plug-ins is configured to receive business data to be processed and store the business data to be processed in a corresponding storage space, and to duplicate the business data to be processed and to process the duplicated business data to be processed. The problem of the existing plug-in process management system that when certain plug-in goes wrong the entire business process needs to re-execute from the beginning, resulting in consuming a lot of time, is solved.

13 Claims, 3 Drawing Sheets

(58) Field of Classification Search
CPC .......... G06F 1/3203; G06F 1/329; G06F 3/06; G06F 9/45558; G06F 15/167; G06F 16/11
USPC ......................................................... 707/792
See application file for complete search history.

(56) References Cited

U.S. PATENT DOCUMENTS

| | | | | |
|---|---|---|---|---|
| 9,146,757 | B1 * | 9/2015 | Subramanian | G06F 9/44526 |
| 11,546,428 | B2 * | 1/2023 | Todeschini | G06F 3/0482 |
| 2007/0180312 | A1 * | 8/2007 | Rhodes | G06F 11/2048 714/13 |
| 2012/0023162 | A1 * | 1/2012 | Ott | G06F 9/54 709/203 |
| 2013/0166627 | A1 * | 6/2013 | Villegas | G06F 21/6263 709/203 |
| 2016/0188417 | A1 * | 6/2016 | Karinta | H04L 67/1001 707/654 |
| 2021/0208905 | A1 * | 7/2021 | Jayanthi | G06F 16/16 |
| 2022/0046080 | A1 | 2/2022 | Ka et al. | |
| 2023/0244394 | A1 | 8/2023 | Bert et al. | |
| 2023/0359472 | A1 * | 11/2023 | Zhang | H04L 67/34 |

FOREIGN PATENT DOCUMENTS

| | | | | | |
|---|---|---|---|---|---|
| CN | 104104708 | A | * | 10/2014 | .............. H04W 4/60 |
| CN | 104932887 | A | | 9/2015 | |
| CN | 106357646 | A | | 1/2017 | |
| CN | 103180849 | B | * | 12/2017 | .......... G06F 16/951 |
| CN | 111562945 | A | | 8/2020 | |
| CN | 111651219 | A | | 9/2020 | |
| CN | 112181522 | A | | 1/2021 | |
| CN | 112817613 | A | | 5/2021 | |
| CN | 113282347 | A | | 8/2021 | |
| CN | 113377785 | A | | 9/2021 | |
| CN | 113900741 | A | * | 1/2022 | .......... G06F 9/5027 |
| CN | 111158779 | B | * | 4/2022 | ........ G06F 9/44526 |
| CN | 114385269 | A | | 4/2022 | |
| CN | 110457925 | B | * | 5/2023 | .......... G06F 21/604 |
| EP | 4456459 | A1 | * | 10/2024 | .......... H04L 1/0044 |
| JP | 2001350504 | A | | 12/2001 | |
| JP | 2011023820 | A | | 2/2011 | |
| JP | 2011029889 | A | | 2/2011 | |
| WO | 2014188492 | A1 | | 2/2017 | |
| WO | WO-2017107826 | A1 | * | 6/2017 | .............. H04L 65/40 |
| WO | WO-2018116453 | A1 | * | 6/2018 | ............... G06F 3/06 |

OTHER PUBLICATIONS

Notification to Grant Patent Right with regard to the CN Patent Application No. 2023800107487 mailed Feb. 9, 2026.
Office Action with regard to the CN Patent Application No. 2023800107487 mailed Sep. 16, 2025.
European Search Report with regard to the EP Patent Application No. EP23892752.9 mailed Jan. 2, 2025.
EPO Communication with regard to the EP Patent Application No. EP23892752.9 mailed Mar. 12, 2025.
Notice of Reasons for Refusal with regard to the JP Patent Application No. 2024-532826 mailed Sep. 17, 2025.
Notice of Reasons for Refusal with regard to the JP Patent Application No. 2024-532826 mailed Dec. 25, 2025.

* cited by examiner

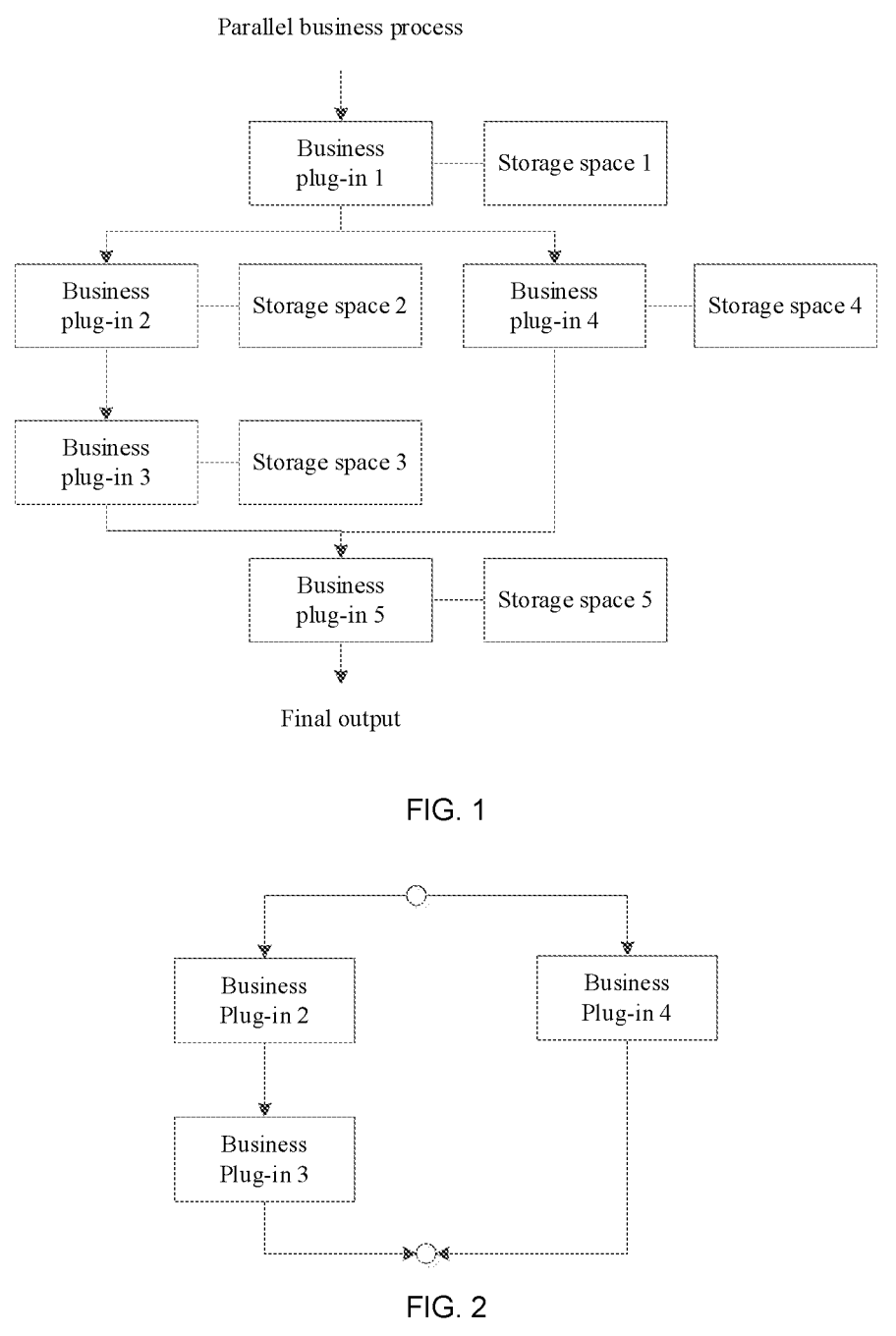

Parallel business process

Business plug-in 1 —— Storage space 1

Business plug-in 2 —— Storage space 2

Business plug-in 4 —— Storage space 4

Business plug-in 3 —— Storage space 3

Business plug-in 5 —— Storage space 5

Final output

FIG. 1

Business Plug-in 2

Business Plug-in 4

Business Plug-in 3

FIG. 2

Parallel business processes

Final output

Parallel business processes

Final output

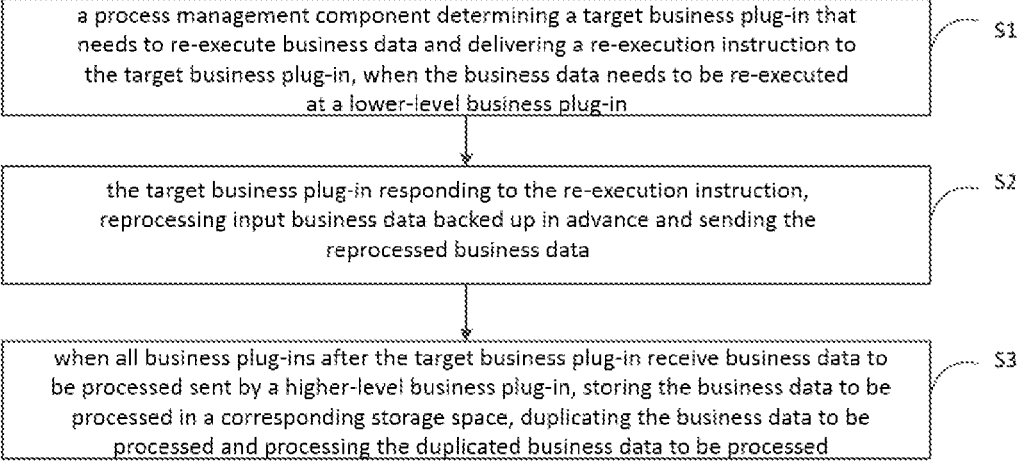

a process management component determining a target business plug-in that needs to re-execute business data and delivering a re-execution instruction to the target business plug-in, when the business data needs to be re-executed at a lower-level business plug-in — S1 the target business plug-in responding to the re-execution instruction, reprocessing input business data backed up in advance and sending the reprocessed business data — S2 when all business plug-ins after the target business plug-in receive business data to be processed sent by a higher-level business plug-in, storing the business data to be processed in a corresponding storage space, duplicating the business data to be processed and processing the duplicated business data to be processed — S3

FIG. 5

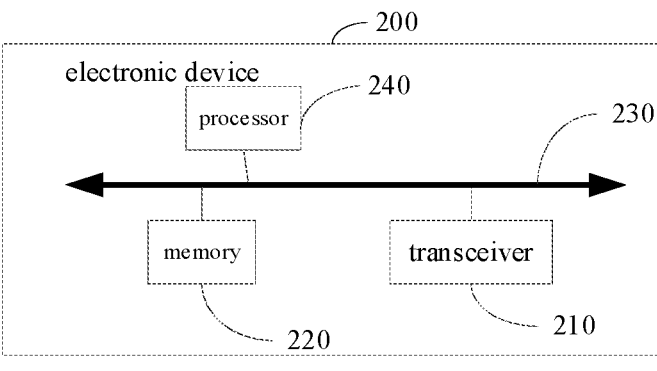

FIG. 6

PLUG-IN PROCESS MANAGEMENT SYSTEM, ELECTRONIC DEVICE AND BUSINESS PROCESS MANAGEMENT METHOD

The present disclosure is a National Stage of International Application No. PCT/CN2023/112339 filed on Aug. 10, 2023, entitled "PLUG-IN PROCESS MANAGEMENT SYSTEM, ELECTRONIC DEVICE AND BUSINESS PROCESS MANAGEMENT METHOD".

TECHNICAL FIELD

The present disclosure belongs to the field of computers and specifically relates to a plug-in process management system, an electronic device, and a business process management method.

BACKGROUND ART

Plug-in process management systems have the advantages of being configurable and easy to build business projects, and are widely used in scenarios such as business approval processes and software development processes. The plug-in process management system includes a process management component and a series of parameterized business plug-ins. The process management component provides functions including querying for all business plug-ins, creating and configuring business projects by organizing and configuring business plug-ins and executing and scheduling business plug-ins.

The current plug-in process management system performs its business in such a way that the higher-level plug-in processes the received data and then provides it to the lower-level plug-in, which processes the received data and then submits it to its next level. When something goes wrong with one of the plug-ins, the entire business process needs to be re-executed from the beginning.

SUMMARY

In view of this, the object of the present disclosure is to provide a plug-in process management system, an electronic device, and a business process management method to improve an existing plug-in process management system, so as to address the problem that when an error is made in one of the plug-ins, the entire business process needs to be re-executed from the beginning, resulting in the need to consume a large amount of time.

Examples of the present disclosure are realized in the way as follows.

In the first aspect, examples of the present disclosure provide a plug-in process management system, comprising: N storage spaces and N business plug-ins, wherein N is an integer greater than or equal to 2; each of the business plug-ins corresponds to a separate storage space, and each of the business plug-ins is configured to receive business data to be processed and store the business data to be processed in a corresponding storage space, and to make a duplicate of the business data to be processed and to process the duplicated business data to be processed.

In the examples of the present disclosure, each business plug-in corresponds to an independent storage space, and each business plug-in can receive the business data to be processed and store it in the corresponding storage space, which makes it possible to directly allow the business plug-in in error to re-execute the data by reading the storage space instead of re-executing the entire process from the beginning, which greatly improves the processing efficiency.

In combination with a possible embodiment of the example of the first aspect, each of the business plug-ins is further configured to respond to the re-execution instruction, to reprocess the pre-stored business data to be processed, and to send the reprocessed business data.

In examples of the present disclosure, each business plug-in can respond to a re-execution instruction to reprocess the business data to be processed stored in advance and send the reprocessed business data, such that when a business plug-in makes an error, the business plug-in that made the error can be directly allowed to read the data in the storage space to perform a re-execution, instead of re-executing the entire process from the beginning, which greatly improves the processing efficiency.

In conjunction with one possible embodiment of the example of the first aspect, the plug-in process management system further comprises a process management component, wherein the process management component is connected to each of the business plug-ins. The process management component is configured to determine a target business plug-in, which is required to re-execute the business, and deliver a re-execution instruction to the target business plug-in, when the business data is required to be re-executed at a lower-level business plug-in.

In examples of the present disclosure, the process management component is utilized to deliver a re-execution instruction to a target business plug-in that needs to re-execute the business, in order to instruct the target business plug-in to re-execute the pre-stored business data to be processed, thereby eliminating the need to re-execute the entire process from the beginning, and greatly improving the processing efficiency.

In conjunction with one possible embodiment of the example of the first aspect, the plug-in process management system further comprises a shared storage space, wherein the shared storage space is configured to store business data common to a plurality of business plug-ins. The independent storage space of each of the business plug-ins is configured to store business data unique to each business plug-in.

In the examples of the present disclosure, a shared storage space is utilized to store business data that is common to multiple business plug-ins, which reduces the number of times to deliver the same data, such that the execution efficiency can be improved.

In combination with one possible embodiment of the example of the first aspect, each business plug-in has a dormant state and a working state, wherein the power consumption in the dormant state is less than the power consumption in the working state.

In examples of the present disclosure, each business plug-in has a dormant state and a working state, wherein the business plug-in can be configured, such that it belongs to a different state, for example, each business plug-in can be put in a "dormant" state at the end of the execution of the entire process, thereby saving power consumption.

In conjunction with one possible embodiment of the example of the first aspect, each business plug-in is further configured to respond to the delete instruction, which is to delete the self-stored business data to be processed.

In examples of the present disclosure, in order to save the cost of data storage, after the entire process has been successfully executed, a business process to clean up the data can be automatically initiated to allow each business plug-in to delete the respective stored data.

In combination with one possible embodiment of the example of the first aspect, each of the business plug-ins is a single plug-in or a combination plug-in, wherein the combination plug-in includes a plurality of single plug-ins.

In examples of the present disclosure, multiple single plug-ins can be combined to be used as a combination plug-in, such that a series of complex processes can be combined into a combination plug-in, which can simplify the system structure as well as the difficulty of maintenance and use of the business process.

In the second aspect, examples of the present disclosure also provide a plug-in process management system, including: N business plug-ins and process management components, wherein each of the business plug-ins is configured to store received business data to be processed to a corresponding storage space, to duplicate the business data to be processed and to process the duplicated business data to be processed, wherein N is an integer greater than or equal to 2. The process management component is connected to each of the business plug-ins, wherein the process management component is configured to determine a target business plug-in that needs to re-execute the business data and deliver a re-execution instruction to the target business plug-in, when the business data needs to be re-executed at a lower-level business plug-in. The target business plug-in is configured to respond to the re-execution instruction, re-process the pre-stored business data to be processed, and send the re-processed business data.

In the third aspect, examples of the present disclosure also provide an electronic device, including: the process management system provided by the above-mentioned examples of the first aspect and/or any possible embodiment combined with the examples of the first aspect, or a process management system as provided in the above examples of the second aspect.

In the fourth aspect, examples of the present disclosure further provide a business process management method, including: the process management component determining a target business plug-in that needs to re-execute the business data and delivering a re-execution instruction to the target business plug-in, when the business data needs to be re-executed at a lower-level business plug-in; the target business plug-in responding to the re-execution instruction, re-processing the input business data backed up in advance and sending the re-processed business data; and when all business plug-ins after the target business plug-in receive business data to be processed sent by a higher-level business plug-in, storing the business data to be processed in a corresponding storage space, duplicating the business data to be processed and processing the duplicated business data to be processed.

In combination with one possible embodiment of the example of the fourth aspect, the method further comprises: the process management component obtaining the position of the target business plug-in in the entire business process; the process management component obtaining all business plug-ins located after the target business plug-in; the process management component sending a save instruction to all business plug-ins after the target business plug-in; and using the save instruction to instruct the business plug-in to store received business data to be processed in the corresponding storage space.

Other features and advantages of the present disclosure will be set forth in the subsequent specification. The objects and other advantages of the present disclosure can be realized and obtained by the structures particularly indicated in the specification as written and in the drawings.

BRIEF DESCRIPTION OF DRAWINGS

In order to more clearly illustrate the technical solutions in the examples or prior art of the present disclosure, the drawings to be used in the embodiments will be briefly introduced below, obviously, the drawings in the following description are only some of the examples of the present disclosure, and for a person of ordinary skill in the art, other drawings can be obtained based on these drawings without putting in inventive effort. The foregoing and other objects, features, and advantages of the present disclosure will be clearer by the drawings.

FIG. 1 is a principle schematic view of a plug-in process management system provided by examples of the present disclosure.

FIG. 2 is a structural schematic view of a combination plug-in provided by examples of the present disclosure.

FIG. 5 is a flow chart of a business process management method provided by examples of the present disclosure.

FIG. 6 is a structural schematic view of an electronic device provided by the example of the present disclosure.

DETAILED DESCRIPTION OF EMBODIMENTS

Figure 3:
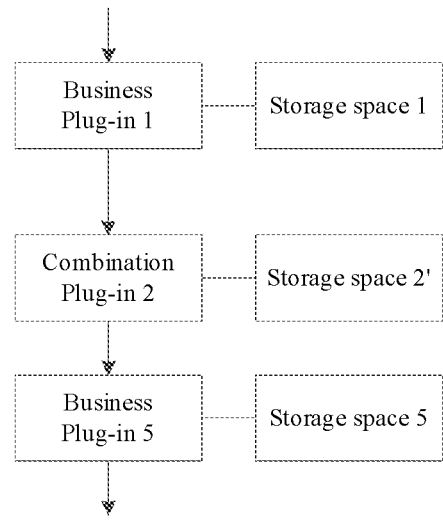
FIG. 3 is the equivalent schematic view of FIG. 1.

The technical solutions in the examples of the present disclosure will be described below in conjunction with the drawings in the embodiments of the present disclosure. Obviously, the described examples are only a part of the examples of the present disclosure and are not all of the examples. The following examples can be used as examples to more clearly illustrate the technical solutions of the present disclosure, and are not to be used to limit the scope of protection of the present disclosure. It will be understood by those of ordinary skill in the art that the following examples and features in the examples can be combined with each other without conflict.

The terms "including", "comprising", or any other variant thereof, are intended to cover non-exclusive inclusion, so that a process, method, article, or equipment comprising a set of elements includes not only those elements, but also other elements that are not explicitly listed, or that are inherent to such process, method, article or equipment. Without further limitations, elements defined by the phrase "comprising a . . . " do not exclude the presence of additional identical elements in the process, method, article, or equipment including the elements.

Further, the term "and/or" in the present disclosure, is merely an associative relationship describing the associated objects, indicating that three relationships can exist, e.g., A and/or B, can indicate the three scenarios, which are A alone, both A and B, and B alone.

Given the existing plug-in process management system, when a business plug-in runs wrong, the entire business process needs to be re-executed from the beginning, resulting in the need to consume a lot of time. In order to save time consumed by the process, the execution of individual business plug-ins can be repeated simultaneously, such that if an error occurs in one of the business plug-ins, the error can be corrected and the execution can continue in the current business plug-in instead of starting from the beginning.

In view of this, examples of the present disclosure provide a plug-in process management system, which supports parallel execution of business flows, while each business plug-in can save its own input data, and thus when an error occurs in one of the business plug-ins, the error can be corrected at the current business plug-in and the execution can continue instead of re-executing the entire process from the beginning.

For better understanding, the plug-in process management system provided by the example of the present disclosure will be described below in connection with FIG. 1, wherein the plug-in process management system includes N storage spaces and N business plug-ins, wherein N is an integer greater than or equal to 2. N depends on the complexity of the business project, wherein the more complex the business project to be processed is, the more business plug-ins are required. For example, the structure of the plug-in process management system used for business approval processes is different from the structure of the plug-in process management system used for the development process.

If the plug-in process management system is regarded as an APP (such as a business approval APP, or software development APP), the business plug-in can be regarded as a functional module that constitutes the whole APP. As the design functions of the APP increase, the corresponding business plug-ins increase. When a new business function needs to be added, a new business plug-in can be added, and the mutual cooperation relationship between the new business plug-in and the original business plug-ins can be configured to achieve the purpose of new functions. These N storage spaces can be from the same memory, wherein the memory can be divided into N parts of storage space, and each business plug-in corresponds to one separate storage space.

These N business plug-ins work in conjunction with each other to accomplish the specified business project. These N business plug-ins can be configured to be connected in series or series-parallel depending on the needs of the business project to realize the processing of the specified business project. For example, in FIG. 1, business plug-in 1, business plug-in 2, business plug-in 3, business plug-in 4, and business plug-in 5 are business plug-ins; business plug-in 1, business plug-in 4, and business plug-in 5 are connected in series with each other; business plug-in 1, business plug-in 2, business plug-in 3, and business plug-in 5 are connected in series with each other; and business plug-in 4 is connected in parallel with business plug-in 2 and business plug-in 3.

In the conventional process, business plug-in 2, business plug-in 3 and business plug-in 4 cannot be executed at the same time, and if processing in parallel is needed, two different tasks usually need to be created. However, in business processes in parallel, they can be executed concurrently as different business plug-ins for the same task, thereby saving process time.

Business plug-ins can be connected in parallel or in series with other business plug-ins for data delivery and sequential scheduling execution. In the scenario of execution in series, the higher-level plug-in stores the data in its own corresponding storage space, and at the same time, replicates the data and processes the replicated data, and provides the processed data to the lower level, while the lower-level plug-in, after receiving the data sent from the higher-level plug-in, stores the data to its own storage space, and at the same time, replicates the data and processes the replicated data, and then transmits the new data obtained after processing to the lower level.

It is understood that the structure of the plug-in process management system is not limited to that shown in FIG. 1, and the corresponding structure is different according to the different processing businesses, i.e., the connection method of these N business plug-ins can be changed and the number of N can be increased or decreased according to the different processing objects and usage scenarios.

Each business plug-in can be a single plug-in or a combination plug-in, wherein the combination plug-in includes a plurality of single plug-ins. For example, in one embodiment, the business plug-in 2, business plug-in 3, and business plug-in 4 in FIG. 1 can be combined into a completely new combination plug-in, and such a combination plug-in can be referred to as a template-type plug-in, and a schematic view thereof is shown in FIG. 2. The business project of the plug-in process management system is configured to support template-type plug-ins, wherein the plug-in is not a specific business plug-in, but a new plug-in built from a combination of other business plug-ins, and the business project can use such template-type plug-in directly as a business plug-in. This allows a series of complex processes to be combined into a template-type plug-in, thereby simplifying the maintenance and use of business processes.

In an optional embodiment, the plug-in process management system shown in FIG. 1 can be simplified to the plug-in process management system shown in FIG. 3, wherein the combination plug-in 2 in FIG. 3 includes the business plug-in 2, the business plug-in 3, and the business plug-in 4 in FIG. 1. Regardless of whether the business plug-in is a single plug-in or a combination plug-in, each business plug-in corresponds to a storage space. For example, the combination plug-in in FIG. 3 corresponds to storage space 2'.

Each business plug-in in accordance with its position in the business project process is divided into higher-level plug-ins or lower-level plug-ins, wherein the lower-level plug-ins are responsible for processing the business data delivered by the higher-level plug-in connected to it (i.e., the business data to be processed). Multiple lower-level plug-ins can be connected in series at the lower level of a certain business plug-in, wherein these lower-level plug-ins can be in a parallel relationship and process their respective business data respectively. Each parallel business can also connect therein with sub-businesses in series and rejoin them in a certain business plug-in that supports multiple inputs.

Each business plug-in corresponds to a storage space that stores independently, in order to enable each business plug-in to save its own input data. Each business plug-in is configured to receive business data to be processed and store the business data to be processed in corresponding storage space, as well as to duplicate the received business data to be processed, and to process the duplicated business data to be processed, after which the processed data is sent out.

It is understood that different business plug-ins have different processing methods for processing the received business data, and the corresponding processing methods are different for different application scenarios, for example, the processing methods include, but are not limited to, data operation, data forwarding, format conversion, data filtering, and the like.

Since each business plug-in has its own corresponding storage space, the processing of multiple data streams can be supported. Even if the data streams cannot be processed at the same time, they can be stored in the storage space first, and then the business data can be duplicated from the storage space for processing when they can be processed.

The plug-in process management system provided by examples of the present disclosure can store the business data to be processed in the corresponding storage space and can support parallel processing, when processing data streams, because each business plug-in has its own corresponding storage space. At the same time, each business plug-in can save its own input data, so when a business plug-in makes an error, the error can be corrected in the current business plug-in and the execution can be continued, rather than re-executing the entire process from the beginning, thereby greatly improving the processing efficiency.

Each business plug-in will duplicate the business data of higher level and process the duplicated business data, and keep the original parent data unchanged, such that once re-executing a business process is needed, there is no need to start from the beginning, and only modifying the configuration of the problematic business plug-in can resume the execution therefrom.

In an optional embodiment, each business plug-in is further configured to respond to the re-execution instruction, reprocess the pre-stored business data to be processed and send the reprocessed business data. In this way, when an error occurs in a business plug-in, the error can be corrected and execution of the current business plug-in can be continued instead of starting from the beginning.

In an optional embodiment, the plug-in process management system further includes a process management component, wherein the process management component is connected to each of the business plug-ins. The process management component is configured to determine a target business plug-in that needs to re-execute the business when the business data needs to be re-executed at a lower-level business plug-in, and issue a re-execution instruction to the target business plug-in. Therefore, the target business plug-in responds to the re-execution instruction, re-processes the pre-stored business data to be processed, and sends the re-processed business data.

The lower-level business plug-in is distinguished based on the position of the business plug-in in the plug-in process management system, and all business plug-ins not at the head end (or top) can be called the lower-level business plug-ins. For example, for FIG. 1, business plug-in 2, business plug-in 3, business plug-in 4, and business plug-in 5 are all lower-level business plug-ins compared to business plug-in 1, and when any of the above-mentioned business plug-ins run out of order, they can be used as the business plug-ins to re-execute the business data.

The process management component establishes and configures business projects by organizing and configuring business plug-ins, executes and schedules business plug-ins and other functions, and can instruct various business plug-ins to work together to complete business projects by issuing their respective configuration instructions to each business plug-in.

In an optional embodiment, whether each business plug-in saves input data or not can be configured. When a business plug-in does not save input data, its lower-level plug-ins cannot repeatedly obtain the same input data, and thus cannot be used as a starting plug-in for re-execution; and when the business needs to be re-executed, it can only be executed from the previous business plug-in of such business plug-in. Whether each business plug-in saves input data or not can be configured by a command delivered by the process management component.

In an optional embodiment, in order to save the cost of data storage, after the entire process is successfully executed, a business process to clean up the data can be automatically initiated to allow each business plug-in to remove the respective stored data. In this embodiment, each business plug-in is further configured to respond to the delete instruction, which is to delete the self-stored business data to be processed. The deletion instruction can be sent by the process management component, and when the entire process is successfully executed, the process management component sends delete instructions to each business plug-in, and each business plug-in responds to the deletion instruction and deletes the self-stored business data to be processed.

In an optional embodiment, each business plug-in has respective internal attributes, such as having a dormant state and a working state, wherein the power consumption in the dormant state is less than the power consumption in the working state. A business plug-in with this attribute can be left in a "dormant" state after the entire process execution is complete, and the user can re-trigger the business to resume from a dormant state and continue the execution once newly configured data is ready. Business plug-ins can be configured to belong to different states by issuing commands through the process management component.

In an optional embodiment, the plug-in process management system can further include a shared storage space (not shown in the drawings), which is configured to store business data that is common to a plurality of business plug-ins. The independent storage space of each business plug-in is configured to store the unique business data of each business plug-in. Business data can be categorized into global data type and business-plug-in-specific data type. When building a business, if the name of configuration is required by more than one plug-in, the data type is a global data type, otherwise, it is a plug-in-specific data type. By storing the global data type in a shared storage space common to each business plug-in, the business initiator can initiate a business with no need to repeatedly enter redundant data by simply storing the global data directly in the shared storage space.

Figure 4:
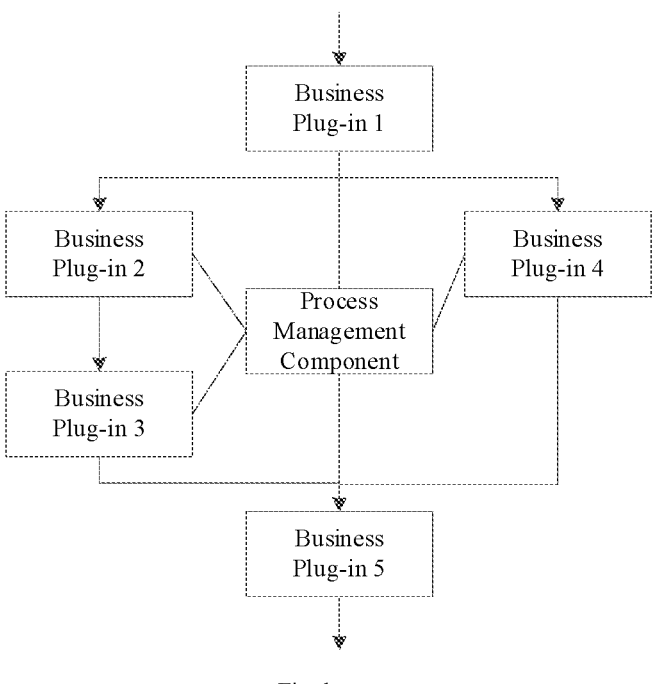
FIG. 4 is a principle schematic view of another plug-in process management system provided by examples of the present disclosure.

Based on the same inventive conception, examples of the present disclosure also provide a plug-in process management system, including: N business plug-ins and process management components, wherein N is an integer greater than or equal to 2, as shown in FIG. 4.

These N business plug-ins cooperate with each other to accomplish specified business projects, wherein each business plug-in is configured to store received business data to be processed to the corresponding storage space, and to replicate the business data to be processed, and to process the replicated business data to be processed.

The process management component is connected to each of the business plug-ins, wherein the process management component determines the target business plug-in that needs to re-execute the business data and deliver a re-execution instruction to the target business plug-in, when it is configured that business data needs to be re-executed at a lower-level business plug-in. The target business plug-in is configured to respond to a re-execution instruction, reprocess the pre-stored business data to be processed, and send the reprocessed business data.

It can be understood that the realization principle and the produced technical effect of the above-described plug-in process management system (FIG. 4) are the same as the example of the plug-in process management system shown in FIG. 1. For a brief description, matters not mentioned in this example can be referred to the corresponding content in the aforementioned plug-in process management system embodiment.

Based on the same inventive concept, examples of the present disclosure further provide a business process management method, which will be described below combined with FIG. 5. The business process management method shown in FIG. 5 can be applied to the plug-in process management system described above.

S1: when the business data needs to be re-executed at a lower-level business plug-in, the process management component determines the target business plug-in that needs to re-execute the business data and delivers a re-execution instruction to the target business plug-in.

When an error occurs in the operation of a business plug-in, and the business data is required to be re-executed at a lower-level business plug-in, the process management component determines the target business plug-in that needs to re-execute the business data and delivers a re-execution instruction to the target business plug-in.

S2: the target business plug-in responds to the re-execution instruction, reprocesses the input business data backed up beforehand, and then sends the reprocessed business data.

It can be understood that each business plug-in can be configured to store the input business data in a corresponding storage space, in order to facilitate subsequent re-processing of the previously backed-up input business data when receiving a re-execution instruction, and sending the re-processed business data.

S3: when all business plug-ins after the target business plug-in receive business data to be processed sent by a higher-level business plug-in, the business data to be processed is stored in a corresponding storage space, the business data to be processed is duplicated and the duplicated business data to be processed is processed.

Since each business plug-in can be configured to receive business data to be processed and store the business data to be processed in the corresponding storage space, as well as to replicate the business data to be processed and process the replicated business data to be processed, in this way, when the target business plug-in as a lower-level business plug-in re-executes the business data and all the business plug-ins located after the target business plug-in receive the business data to be processed sent by the higher-level business plug-in, the business data to be processed will be stored to the corresponding storage space, the business data to be processed will be replicated, and the replicated business data to be processed will be processed.

Optionally, the method further comprises: the process management component obtaining the position of the target business plug-in in the overall business process; the process management component obtaining all business plug-ins located after the target business plug-in; the process management component sending a save command to all business plug-ins after the target business plug-in; and using the save command to instruct the business plug-in to store the received business data to be processed to the corresponding storage space. In the embodiment, whether each business plug-in saves the received input data or not is configurable, and the way of configuration is relatively simple, which requires only the delivery of a corresponding configuration instruction. For example, delivering a save instruction can instruct the business plug-in to save the received input data.

Optionally, the method further comprises: after the entire process is successfully executed, the process management component delivering delete instructions to each business plug-in, and each business plug-in responding to the delete instruction and deleting its own stored business data to be processed.

The implementation principles and technical effects of the business process management method provided by the examples of the present disclosure are the same as examples of the aforementioned plug-in process management system, and for a brief description, where the method examples are not mentioned, reference can be made to the corresponding contents in the aforementioned plug-in process management system embodiments.

Examples of the present disclosure also provide an electronic device that includes the plug-in process management system described above. Optionally, as shown in FIG. 6, the electronic device 200 includes: transceiver 210, memory 220, communication bus 230, and processor 240. Various plug-ins in the plug-in process management system described above can be deployed in the processor 240. The storage space in the plug-in process management system can be from the memory 220. The memory 220 can be divided into N storage spaces in one-to-one correspondence to N business plug-ins.

The elements such as the transceiver 210, the memory 220, and processor 240 are electrically connected to each other, either directly or indirectly, so as to realize the transmission or interaction of data. For example, these elements can be electrically connected to each other via one or more communication buses 230 or signal lines. Transceiver 210 is used to send and receive data. Memory 220 is used to store a computer program, such as storing a computer program required to perform the business process management method described above. The computer program comprises at least one software function module that can be stored in memory 220 in the form of software or firmware, or hardened in the operating system (OS) of the electronic device 200. The processor 240, for executing executable modules stored in memory 220, so as to perform the business process management method described above.

The memory 220 can be, but is not limited to, Random Access Memory (RAM), Read Only Memory (ROM), Programmable Read-Only Memory (PROM), Erasable Programmable Read-Only Memory (EPROM), Electric Erasable Programmable Read-Only Memory (EEPROM), and the like.

The processor 240 can be an integrated circuit chip with signal processing capabilities. The above-mentioned processors can be general-purpose processors, including Central Processing Unit (CPU), Network Processor (NP), microprocessors, etc.; and they can further be Digital Signal Processor (DSP), Application Specific Integrated Circuit (ASIC), Field Programmable Gate Array (FPGA) or other programmable logic devices, discrete gate or transistor logic devices, or discrete hardware. They can realize or perform methods, steps, and logical block diagrams of the disclosure of the examples of the present disclosure. Alternatively, the processor 240 can be any conventional processor, etc.

The aforementioned electronic device 200 includes but is not limited to tablets, computers, vehicle-mounted devices, and the like.

It should be noted that the various examples in the specification are described in a progressive manner, wherein each example focuses on the differences with other examples, and the same or similar parts between the various examples can be referred to each other.

In the several examples provided in the present disclosure, it should be understood that the apparatus and methods disclosed can also be realized in other ways. The above-described examples of the device are merely schematic, for example, the flowcharts and block diagrams in the drawings show the system architecture, functionality, and operation that can be realized by the devices, methods, and computer program products according to a plurality of examples of the present disclosure. In this point, each box in a flowchart or block diagram can represent a module, a program segment, or a part of code, wherein the module, the program segment, or the part of code includes one or more executable instructions for carrying out a defined logical function. It should also be noted that, in some implementations as substitutions, the functions indicated in the boxes can also occur in a different order than those indicated in the drawings. For example, two consecutive boxes can actually be executed essentially in parallel, and they can sometimes be executed in reverse order, depending on the function involved. It should be noted as well that each box in the block diagram and/or flowchart, and combinations of boxes in the block diagram and/or flowchart, can be implemented with a dedicated hardware-based system that performs the specified function or action, or can be implemented with a combination of dedicated hardware and computer instructions.

In addition, the functional modules in various examples of the present disclosure can be integrated together to form an independent part, or each module can exist separately, or two or more modules can be integrated to form an independent part.

The above-mentioned are only specific embodiments of the present disclosure, but the scope of protection of the present disclosure is not limited thereto, and any person of ordinary skill in the art who is familiar with the technical field can easily think of variations or substitutions within the scope of the technology disclosed in the present disclosure shall be covered by the scope of protection of the present disclosure. Therefore, the scope of protection of the present disclosure should be subject to the scope of protection of the claims.

What is claimed is:

1. A plug-in process management system, comprising:

N storage spaces, wherein N is an integer greater than or equal to 2; and

N business plug-ins, wherein each of the business plug-ins corresponds to a separate storage space, and each of the business plug-ins is configured to receive business data to be processed and store the business data to be processed to a corresponding storage space, and to duplicate the business data to be processed and to process the duplicated business data to be processed;

wherein each of the business plug-ins is further configured to respond to a re-execution instruction, to reprocess pre-stored business data to be processed, and to send the reprocessed business data;

wherein the plug-in process management system further comprises a process management component, wherein the process management component is connected to each of the business plug-ins; and wherein the process management component is configured to determine a target business plug-in that needs to re-execute a business, and deliver the re-execution instruction to the target business plug-in, when business data needs to be re-executed at a lower-level business plug-in.

2. The plug-in process management system according to claim 1, wherein the plug-in process management system further comprises a shared storage space, wherein the shared storage space is configured to store business data common to a plurality of business plug-ins; and an independent storage space of each of the business plug-ins is configured to store business data unique to each business plug-in.

3. The plug-in process management system according to claim 1, wherein each business plug-in has a dormant state and a working state, wherein a power consumption in the dormant state is less than a power consumption in the working state.

4. The plug-in process management system according to claim 1, wherein each business plug-in is further configured to respond to a delete instruction, which is to delete self-stored business data to be processed.

5. The plug-in process management system according to claim 1, wherein each of the business plug-ins is a single plug-in or is a combination plug-in, wherein the combination plug-in comprises a plurality of single plug-ins.

6. The plug-in process management system according to claim 1, further comprising:

a process management component, connected to each of the business plug-ins, wherein the process management component is configured to determine a target business plug-in that needs to re-execute business data and deliver a re-execution instruction to the target business plug-in, when the business data needs to be re-executed at a lower-level business plug-in; and the target business plug-in is configured to respond to the re-execution instruction, to reprocess pre-stored business data to be processed and send the reprocessed business data.

7. An electronic device, comprising the process management system according to claim 1.

8. The plug-in process management system according to claim 2, wherein each of the business plug-ins is a single plug-in or is a combination plug-in, wherein the combination plug-in comprises a plurality of single plug-ins.

9. The plug-in process management system according to claim 3, wherein each of the business plug-ins is a single plug-in or is a combination plug-in, wherein the combination plug-in comprises a plurality of single plug-ins.

10. The plug-in process management system according to claim 4, wherein each of the business plug-ins is a single plug-in or is a combination plug-in, wherein the combination plug-in comprises a plurality of single plug-ins.

11. The electronic device according to claim 7, wherein the plug-in process management system further comprises a shared storage space, wherein the shared storage space is configured to store business data common to a plurality of business plug-ins; and an independent storage space of each of the business plug-ins is configured to store business data unique to each business plug-in.

12. The electronic device according to claim 7, wherein each business plug-in has a dormant state and a working state, wherein a power consumption in the dormant state is less than a power consumption in the working state.

13. The electronic device according to claim 7, wherein each business plug-in is further configured to respond to a delete instruction, which is to delete self-stored business data to be processed.

* * * * *